J. DINHOFER.
FINGER MEASURING DEVICE.
APPLICATION FILED JUNE 8, 1918.
1,282,772.
Patented Oct. 29, 1918.
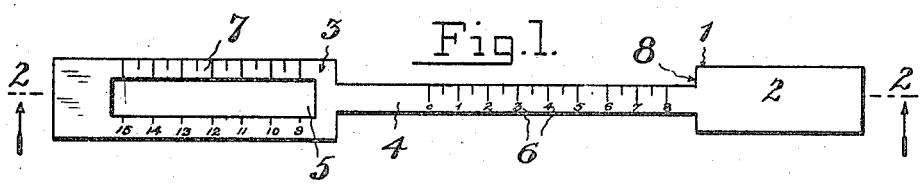
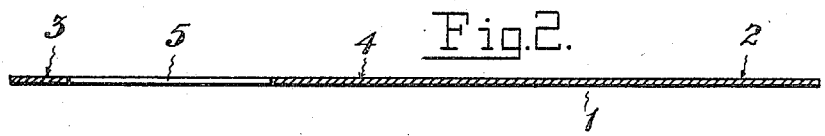
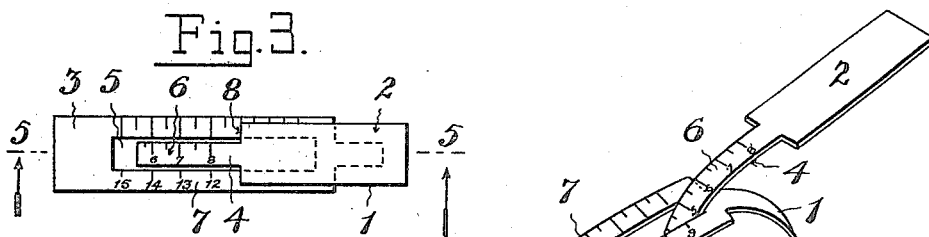
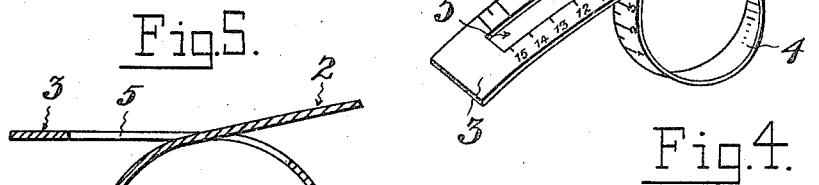
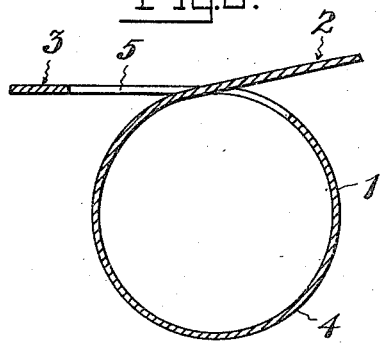
Inventor
Julius Dinhofer
By his Attorney
Harry Radzinsky

UNITED STATES PATENT OFFICE.

JULIUS DINHOFER, OF NEW YORK, N. Y.

FINGER-MEASURING DEVICE.

1,282,772.

Specification of Letters Patent.

Patented Oct. 29, 1918.

Application filed June 8, 1918. Serial No. 238,817.

*To all whom it may concern:*

Be it known that I, JULIUS DINHOFER, a citizen of the United States, and a resident of the city, county, and State of New York, have invented a certain new and useful Improvement in Finger-Measuring Devices, of which the following is a specification.

This invention relates to a device for measuring the size of fingers for use in determining the proper size of finger ring to be used. Heretofore, devices of this character have consisted of a series of metal rings, the proper sized one being slipped on the purchaser's finger and then measured on a conical rod on which a scale of sizes was marked. This required a trial of varying sizes of rings until the proper size was found, thus incurring delay and inconvenience.

The object of this invention is to provide a small, compact device of this character which will be very inexpensive to manufacture, which will readily determine the proper size of ring to be worn, without delay and inconvenience.

With this object, and other objects which may hereinafter appear, I have devised the particular arrangement of parts set forth in the following description, and more particularly pointed out in the claims appended hereto.

Reference is to be had to the accompanying drawing, forming a part of this application, in which—

Figure 1 is a plan view of my improved finger measuring device;

Fig. 2 is a sectional view on the line 2—2 of Fig. 1, looking in the direction of the arrows;

Fig. 3 is a plan view of the device when placed in condition to embrace a finger;

Fig. 4 is a perspective view showing the device in condition to measure small sizes; and Fig. 5 is a sectional view on the line 5—5 of Fig. 3 looking in the direction of the arrows.

Throughout the various views of the drawings, similar reference characters designate similar parts.

In the preferred embodiment of my invention, as illustrated in the accompanying drawing, 1 indicates the device, which comprises an elongated strip of any suitable flat, flexible material. This strip 1 is provided with a central narrow portion 4, at the ends of which are elongated enlarged tabs 2 and 3 which are preferably formed integral with the central narrow strip 4. The enlarged end or tab 3 is provided with an elongated, longitudinally extending slot 5, at the sides of which is arranged a scale of finger sizes, as at 7.

The narrow central portion is also provided with a scale of smaller finger sizes, as at 6.

From the foregoing, the operation of my improved finger measuring device will be readily understood.

To use the device, the tab 2 is passed through the slot 5, as shown in Figs. 3, 4 and 5, so that the narrow central portion 4 forms a loop. The finger is then inserted through the loop and the loop is then contracted about the finger by holding the tab 3 and drawing on the tab 2, until it fits the finger properly. If the finger requires a large size, the proper size will be shown where the shoulder 8 of the tab 2 indicates on the scale 7, as shown in Fig. 3, where the loop has been tightened to indicate size 11. If a small size is required, it can be found by utilizing the scale 6 on the narrow strip 4 as shown in Fig. 4 where the loop has been contracted to indicate size 5.

The two scales may or may not be used, as desired, as my device can readily be made to operate with but one scale, with relatively small modifications.

From the foregoing, it will be seen that I have provided an inexpensive and thoroughly practical and useful device which can be very inexpensively manufactured.

It will be obvious that my invention is not to be restricted to the exact embodiment shown, is broad enough to cover all structures coming within the scope of the annexed claims.

Having described my invention, what I claim is:—

1. A device of the class described comprising an elongated strip of flexible material having a narrow, central strip adapted to form a finger-embracing loop, an enlarged end on said narrow strip, said enlarged end having a slot through which the narrow central portion is adapted to pass, there being a scale of sizes on said end adjacent said slot.

2. A device of the class described comprising a strip of flat, flexible material having a narrow central portion bearing a scale of measurements, an enlargement at each end of said narrow central portion, one of said enlargements having a slot through which the narrow central portion is adapted to pass, there being a scale of measurements adjacent said slot.

3. A device of the class described comprising an elongated strip of flat, flexible material, having an elongated narrow central portion adapted to form a finger-embracing loop, said narrow portion having a scale of measurements, an enlargement on each end of said narrow central portion, one of said enlargements having a longitudinal slot through which the narrow central portion is adapted to pass, said enlargement having a scale of measurements at the side of the slot, and the other enlargement having means for indicating sizes on the last mentioned scale.

4. A device of the class described comprising an elongated strip of material having a narrow, central portion adapted to form a finger-embracing loop, an enlargement on each end of said narrow central portion, one of said enlargements having an elongated slot through which the narrow central portion is adapted to pass, a scale of measurements on said enlargement, the other enlargement having a shoulder adapted to indicate the sizes on said scale.

Signed at the city, county and State of New York, this 6th day of June, 1918.

JULIUS DINHOFER.

Copies of this patent may be obtained for five cents each, by addressing the "Commissioner of Patents, Washington, D. C."